(12) United States Patent
Gibson et al.

(10) Patent No.: US 12,708,856 B2
(45) Date of Patent: Aug. 18, 2026

(54) CHAIR SLED ATTACHMENT ASSEMBLY AND ATTACHMENT METHOD FOR GAMING MACHINES

(71) Applicant: Everi Games Inc., Austin, TX (US)

(72) Inventors: Daniel Gibson, Austin, TX (US); Ryan Greene, Austin, TX (US); Craig Gallagher, Austin, TX (US); Steven Speer, Austin, TX (US); Travis Bussey, Austin, TX (US)

(73) Assignee: EVERI GAMES INC., Austin, TX (US)

( * ) Notice: Subject to any disclaimer, the term of this patent is extended or adjusted under 35 U.S.C. 154(b) by 134 days.

(21) Appl. No.: 18/755,188

(22) Filed: Jun. 26, 2024

(65) Prior Publication Data

US 2024/0342619 A1 Oct. 17, 2024

Related U.S. Application Data

(63) Continuation of application No. 17/962,534, filed on Oct. 9, 2022, now Pat. No. 12,023,595.

(51) Int. Cl.
*A63F 13/90* (2014.01)

(52) U.S. Cl.
CPC .................................... *A63F 13/90* (2014.09)

(58) Field of Classification Search
CPC ...................................................... A63F 13/90
See application file for complete search history.

(56) References Cited

U.S. PATENT DOCUMENTS

| | | | |
|---|---|---|---|
| 6,354,660 B1 | 3/2002 | Friedrich | |
| 8,000,484 B2 | 8/2011 | Rasmussen | |
| 2002/0070589 A1 | 6/2002 | Laufer | |
| 2008/0039215 A1 | 2/2008 | Hahn | |
| 2009/0146484 A1 | 6/2009 | Mittler | |
| 2009/0179479 A1 | 7/2009 | Davis, Jr. | |
| 2012/0282997 A1 | 11/2012 | Miner | |
| 2023/0024888 A1* | 1/2023 | Ocampo | G07F 17/3211 |

* cited by examiner

*Primary Examiner* — James S. McClellan
(74) *Attorney, Agent, or Firm* — Sheridan Ross P.C.

(57) ABSTRACT

A chair sled attachment assembly includes a base structure and a chair sled receiver supported on the base structure. The base structure is connected to a gaming machine cabinet in a base position projecting in a front direction from a front side of the cabinet and a base cover of the base structure defines a base volume separate from a secure volume of the cabinet. The chair sled receiver includes a chair sled receiving feature adapted for receiving a portion of a chair sled assembly when a chair sled is placed in an operating position on the gaming machine. A removable cover portion of the base structure is removably secured to the base structure in a cover position covering the chair sled receiving feature.

14 Claims, 10 Drawing Sheets

CHAIR SLED ATTACHMENT ASSEMBLY AND ATTACHMENT METHOD FOR GAMING MACHINES

CROSS-REFERENCE TO RELATED APPLICATION

Applicant claims the benefit, under 35 U.S.C. § 120, of U.S. patent application Ser. No. 17/962,534 filed Oct. 9, 2022, and entitled "Chair Sled Attachment Assembly and Attachment Method for Gaming Machines." The entire content of this nonprovisional patent application is incorporated herein by this reference.

TECHNICAL FIELD OF THE INVENTION

This disclosure relates to attachment assemblies that may be used to connect a chair sled to a gaming machine and to methods for attaching a chair sled to a gaming machine.

BACKGROUND OF THE INVENTION

Electronic gaming machines such as mechanical and video reel-type gaming machines, video poker gaming machines, and other types of gaming machines, are commonly designed to be played by a player seated in front of the gaming machine. To ensure the intended player chair is always available at a gaming machine (and not moved away for use elsewhere), gaming machines commonly include a player chair that is physically connected to the gaming machine cabinet. Some locations that offer play at electronic gaming machines require that a player chair be physically connected to the gaming machine cabinet.

In view of the common requirement for a player chair to be physically connected to the gaming machine cabinet, a standard connecting arrangement has been developed for providing the connection. The standard connecting arrangement includes a chair sled assembly having a player chair secured to an elongated chair sled base. The chair is secured to the chair sled base generally near a distal end of the chair sled base opposite to a proximal end adapted to be connected to the gaming machine. The chair sled base proximal end is configured to be received in a connected position in a chair sled receiver that is itself connected to the gaming machine. The chair sled receiver includes a releasable lock that is adapted to receive an element at the chair sled base proximal end to lock the chair sled in the connected position. A release key may be used to release the lock so that the chair sled base may be removed from the gaming machine as needed for maintenance or other purposes. The standard connecting arrangement allows a gaming machine chair needing service to be removed and replaced with a new or refurbished chair while still reasonably securing the gaming machine chair to the gaming machine as desirable or necessary.

SUMMARY OF THE INVENTION

It is an object of the invention to provide a chair sled attachment assembly that retains the standard chair sled connection while providing ready access to the chair sled receiver so that the chair sled assembly may be easily removed and/or attached with minimal interruption to gaming activity at the gaming machine. Other objects of the invention include providing a gaming machine incorporating such a chair sled attachment assembly, while further objects include methods for attaching a chair sled to a gaming machine.

A chair sled attachment assembly according to a first aspect of the present invention is adapted for use with a gaming machine that includes a cabinet having a secure access arrangement for providing access to a secure volume of the cabinet. Such a chair sled attachment assembly includes a base structure and a chair sled receiver supported on the base structure. The base structure is connected to the cabinet in a base position projecting in a front direction from a front side of the cabinet and includes a base cover that defines a base volume separate from the secure volume of the cabinet. The chair sled receiver includes a chair sled receiving feature adapted for receiving a portion of a chair sled assembly when a chair sled is placed in an operating position on the gaming machine. A removable cover portion of the base structure is removably secured to the base structure in a cover position covering the chair sled receiving feature.

A chair sled attachment assembly according to this first aspect of the invention has the advantage of providing access to the chair sled receiver for replacing a chair sled without having to open the secure volume of the gaming machine cabinet. This enhances security while reducing the time needed for replacing the chair sled and while retaining the standard chair sled and chair sled receiver arrangement.

A second aspect of the invention encompasses gaming machines on which a chair sled assembly according to the first aspect of the invention is installed.

Some implementations according to the first or second aspects of the invention may include a support bracket connecting arrangement that allows the chair sled receiver to be directly connected to the support bracket. Other implementations may use a receiver adapter to allow the chair sled receiver to be connected through the support bracket connecting arrangement.

Embodiments according to the first and second aspects of the invention may further include a sled cover adapted to be removably secured to the removable cover portion in position to cover at least a portion of a base access opening of the base cover. Such a sled cover may be used in implementations where the chair sled receiver protrudes from the base volume when connected in the chair sled receiver operating position. In these cases the installed sled cover may have a rear edge that substantially abuts a front edge of the chair sled receiver.

A third aspect of the invention encompasses methods for attaching a chair sled to a gaming machine. Methods according to this third aspect of the invention includes removing a removable cover portion from a base structure of a gaming machine. The base structure projects in a front direction from a front side of a cabinet of the gaming machine and the base cover defines a base volume separate from a secure volume defined within the gaming machine cabinet. Removing the removable cover portion at least partially exposes a chair sled receiver mounted on the base structure. The method further includes inserting a connecting end of the chair sled to a locked position within a chair sled receiver. Then, with the connecting end of the chair sled in the locked position within the chair sled receiver, the method includes covering at least a portion of the connecting end of the chair sled by removably attaching a cover to the base structure.

In some implementations of a method in accordance with this third aspect of the invention removing the removable cover portion of the base cover exposes an access opening in the base cover. In these implementations inserting the connecting end of the chair sled to the locked position comprises inserting the connecting end of the chair sled through the access opening.

These and other aspects, advantages, and features of the invention will be apparent from the following description of representative embodiments, considered along with the accompanying drawings.

DESCRIPTION OF REPRESENTATIVE EMBODIMENTS

Figure 1:
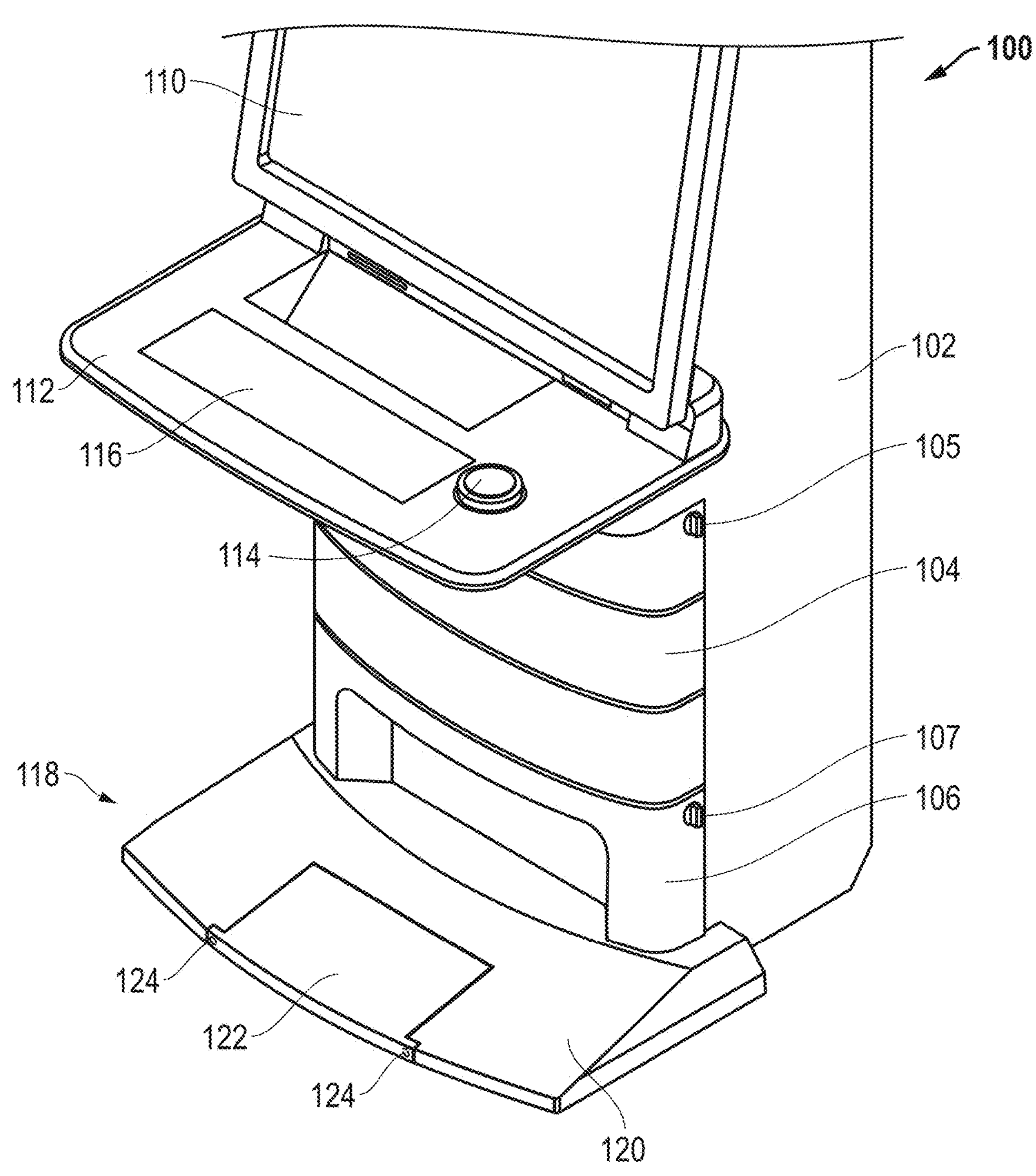
FIG. 1 is an isometric view of a lower portion of a gaming machine that incorporates a chair sled attachment assembly in accordance with aspects of the present invention.

FIG. 1 shows a lower portion of a gaming machine 100 incorporating an example embodiment of a chair sled attachment assembly in accordance with the present invention. Gaming machine 100 includes a cabinet 102 on which is mounted a video display device 110 and a button deck 112. Button deck 112 contains player controls including in this example a play button 114 and a touchscreen button panel 116.

Gaming machine 100 also includes a first cabinet access panel 104 and a second cabinet access panel 106. Each of these cabinet access panels 104 and 106 are adapted to be removed or opened from the position shown in FIG. 1 to provide access to a secure volume of cabinet 102. The secure volume of cabinet 102 is intended for access only to authorized personnel for servicing and configuring the gaming machine and thus each cabinet access panel is associated with a locking device that may be keyed or otherwise configured for operation only by authorized personnel. In this example gaming machine 100, first cabinet access panel 104 includes a first locking device 105 and second cabinet access panel 106 includes a second locking device 107. The two cabinet access panels 104 and 106 and their respective locking device, 105 and 107, together form a secure access arrangement for providing access to the secure volume defined within cabinet 102. This secure volume may house processing devices and storage devices for operational software that controls the operation of gaming machine 100 and thus must be kept secured to prevent tampering with gaming machine operation.

The example chair sled attachment assembly shown in FIG. 1 and the following figures includes a base structure shown generally at reference numeral 118. Base structure 118 is connected to cabinet 102 in a base position projecting in a front direction from a front side of the cabinet. Base structure 118 includes a base cover 120 that covers various structural members of the base structure that may be connected to structural members of the gaming machine cabinet 102. Base cover 120 also defines a base volume within base structure 118.

In accordance with the first aspect of the invention, the example chair sled attachment assembly shown in FIG. 1 includes a removable cover portion of the base structure 118. In the example of FIG. 1, the removable cover portion comprises a base access panel 122 secured in a cover position on the base cover 120. In this example implementation, base access panel 122 may be secured in place by suitable fasteners through fastener openings 124 in FIG. 1. These fastener openings 124 may allow a threaded fastener to be threaded into a suitable threaded receiver either formed on cover 120 or structural members within cover 120. The base volume may be accessed through an excess opening shown in FIG. 1 covered by base access panel 122.

Figure 2:
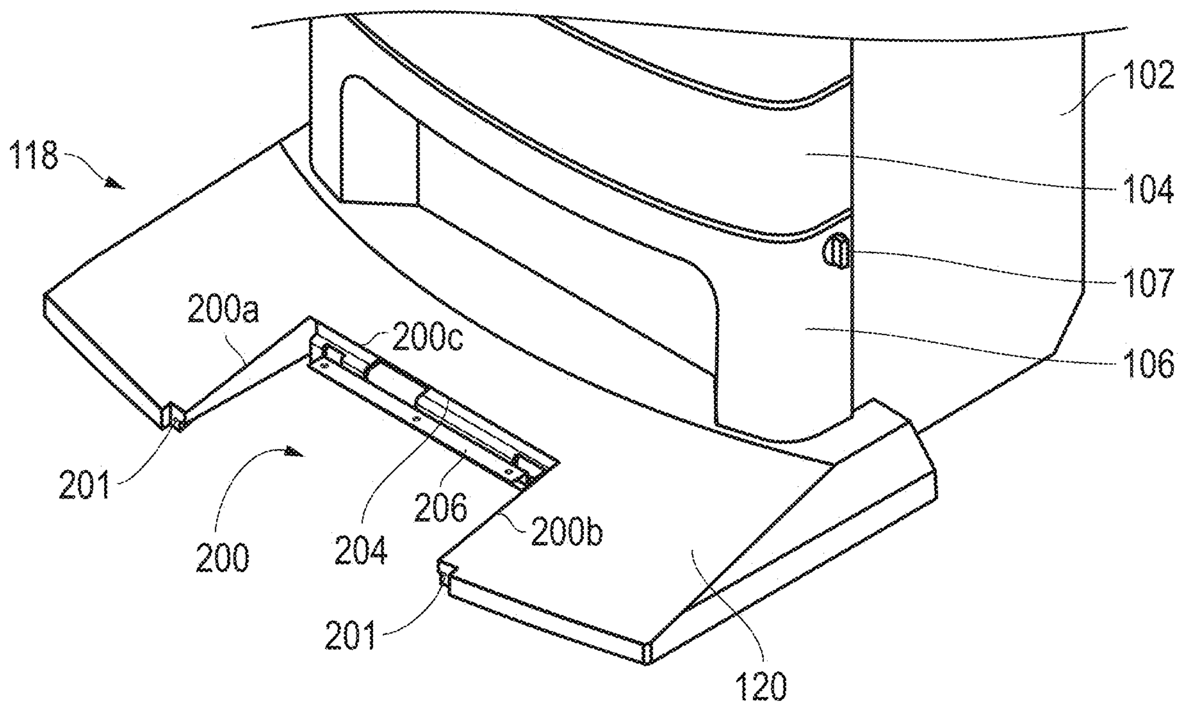
FIG. 2 is an isometric view of the base structure shown in FIG. 1 but showing a base access panel removed from its cover position.

FIG. 2 shows the condition of base structure 118 with base access panel 122 removed from the cover position shown in FIG. 1 to expose the base access opening shown generally at reference numeral 200 in FIG. 2. This base access opening 200 is defined by lateral edges 200*a* and 200*b*, and back edge 200*c*, and comprises an opening in base cover 120 to expose the base volume defined by base structure 118. FIG. 2 shows fastener openings 201 in base structure 118 along with a support bracket 204. Support bracket 204 may form part of or may be connected to the structural members concealed under cover 120. This example implementation also includes an access panel brace 206 shown in FIG. 2 connected to support bracket 204. Access panel brace 206 in this example provides a horizontal bracing member that projects in the front direction from support bracket 204 in position to provide structural support from the underside of base access panel 122 when the base access panel 122 is in the cover position shown in FIG. 1.

Figure 3:
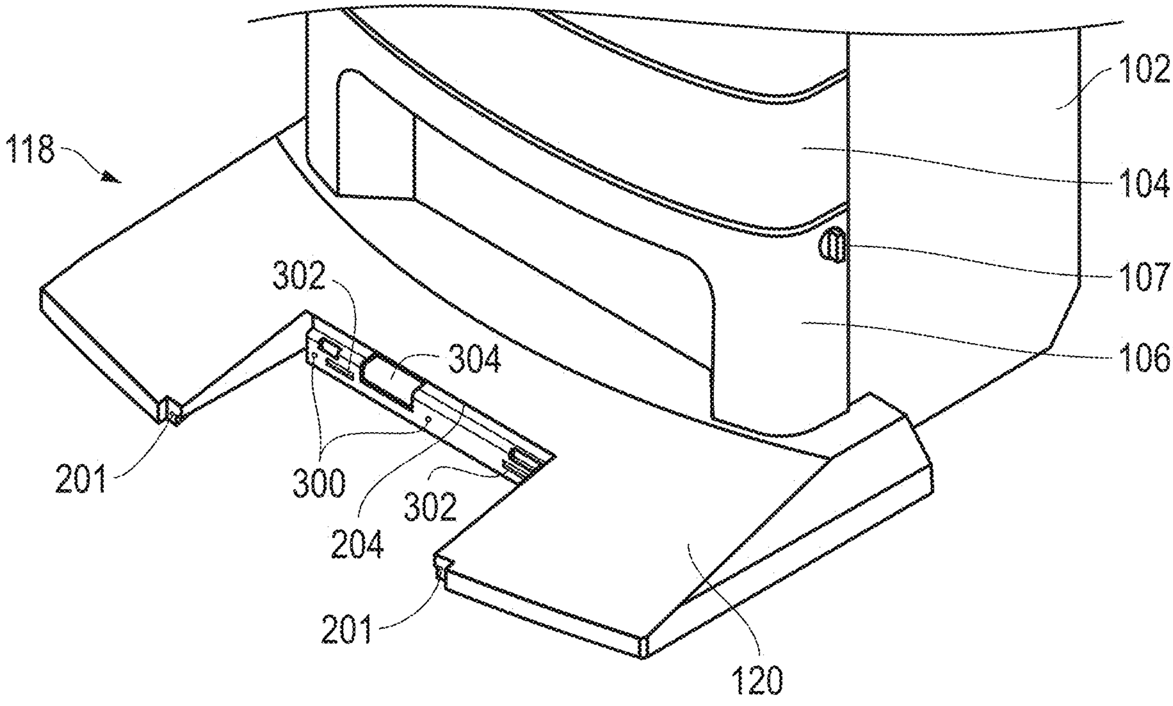
FIG. 3 is an isometric view similar to FIG. 2 but showing the access panel brace removed from the support bracket.

FIG. 3 shows the condition of base structure 118 with access panel brace 206 removed from its secured position on support bracket 204. Example support bracket 204 includes fastener receivers 300, slot openings 302, and a cutout 304. Fastener receivers 300 may be threaded openings for receiving suitable fasteners to fasten access panel brace 206 or other components to the front side of support bracket 204. Slots 302 may receive extensions from a component such as access panel brace 206 when connected to support bracket 204 to enhance the structural connection to the support bracket 204. Cutout 304 exposes an area that may include electrical connectors or plugs. Although not shown in these illustrations, the purpose of such electrical connectors or plugs will be described further below in connection with the chair sled assembly.

Figure 4:
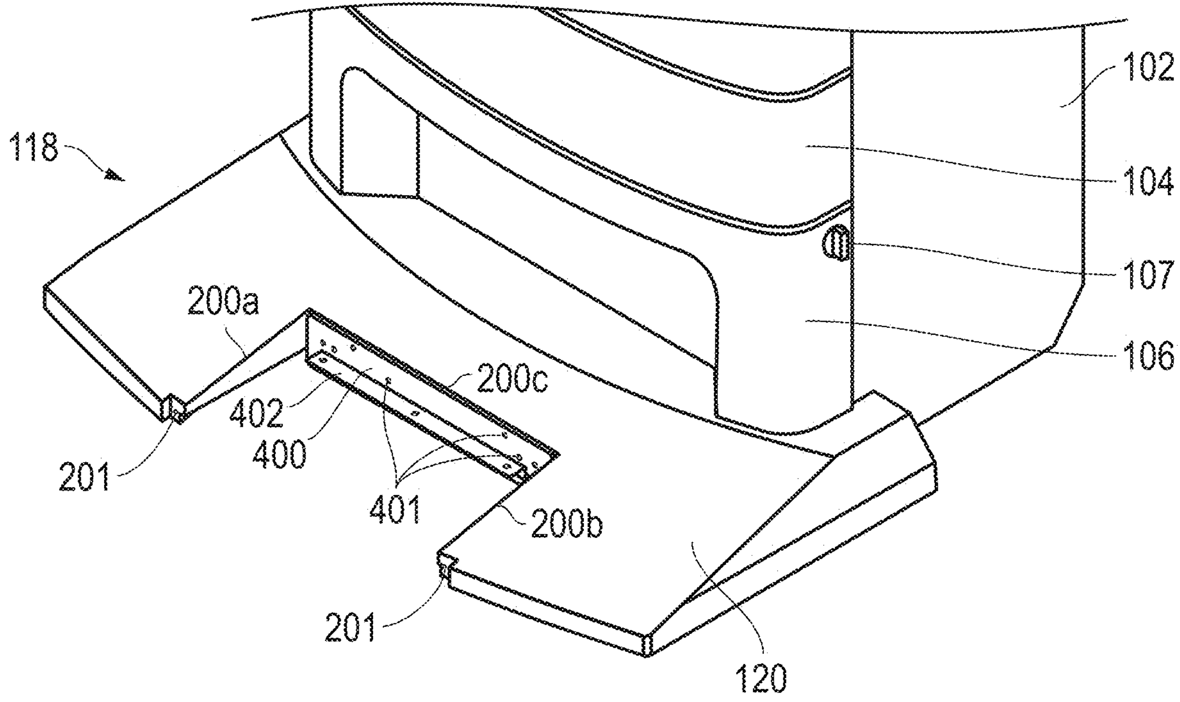
FIG. 4 is an isometric view similar to FIG. 3 but with a receiver adapter connected to the support bracket.

FIG. 4 shows the condition of the example chair sled attachment assembly with an adapter 400 secured to support bracket 204. Adapter 400 is included in this example to provide appropriate connection points for a chair sled receiver as will be described further below. Other implementations of the invention may include appropriate attachment structure built into support bracket 204 and thus obviate the need for an adapter such as adapter 400. The example adapter 400 includes fastener openings 401 that may align with fastener openings 300 on support bracket 204 shown in FIG. 3. Example adapter 400 shown in FIG. 4 also includes an adapter brace 402 protruding in the forward direction and adapted to cooperate with the chair sled receiver as will be described below. It should be noted that example adapter 400 does not include an opening in position to align with cutout 304 on support bracket 204. Thus adapter 400 is not suitable for use where electrical connections are needed in this area. Alternative adapters may include an opening adapted to align with cutout 304 to facilitate electrical connections.

Figure 5:
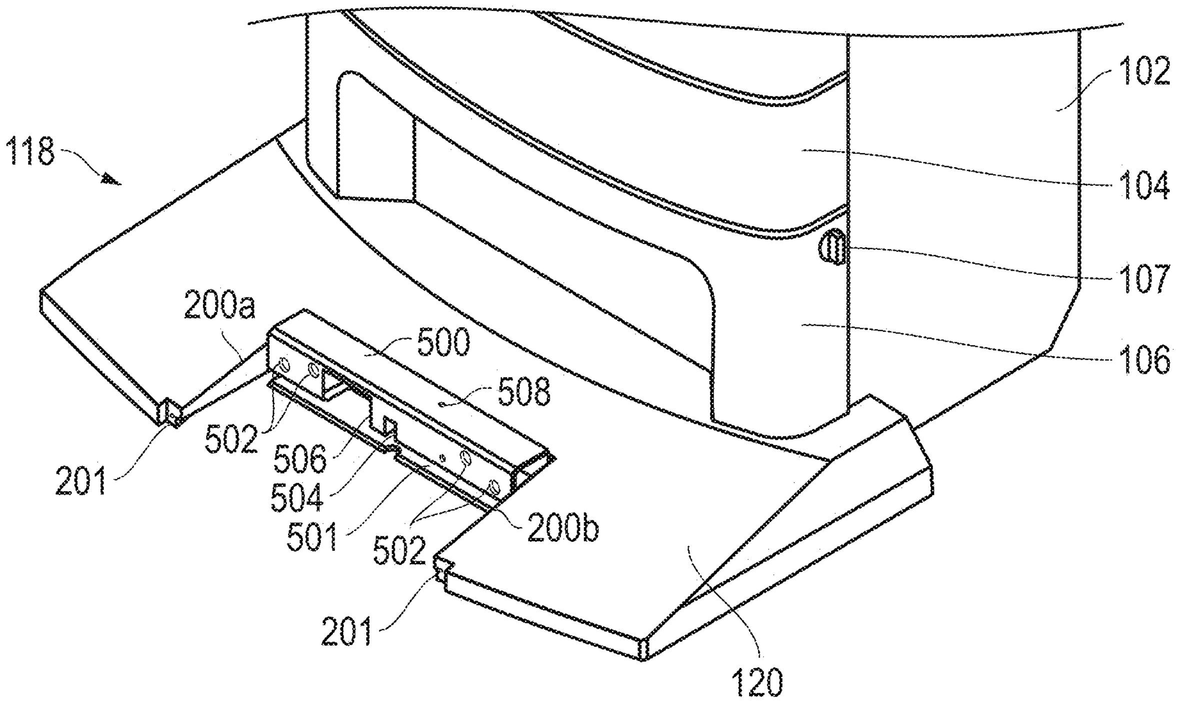
FIG. 5 is an isometric view similar to FIG. 4 but with a chair sled receiver connected in the operating position on the support bracket.

FIG. 5 shows a chair sled receiver 500 connected in a chair sled receiver operating position on support bracket 204 (the bracket 204 being concealed by receiver 500 in FIG. 5 and thus not visible in this figure). In this example, chair sled receiver 500 is connected to support bracket 204 via adapter 400 shown in FIG. 4. Chair sled receiver 500 comprises a standard component for securing a standard chair sled assembly (which will be described below in connection with FIG. 6) and includes an elongated receiver slot 501 for receiving a portion of the chair sled assembly. Chair sled receiver 500 also includes fastener access openings 502 providing access to fastener openings (not shown) at a rear side of the receiver 500. Chair sled receiver 500 also includes a pin receiving slot 504 and electrical plug receiving area shown generally at 506. The elongated receiver slot 501, pin receiving slot 504, and electrical plug receiving area 506 all represent chair sled receiving features in this particular embodiment that are adapted to cooperate with elements of a chair sled assembly as will be described further below. Although not shown in these figures, chair sled receiver 500 also includes a locking mechanism associated with pin receiver slot 504. As will be described further below, this locking mechanism cooperates with a locking pin of the chair sled assembly to lock the chair sled assembly in its installed operating position in receiver 500. The illustrated chair sled receiver 500 also includes a release mechanism opening 508 for receiving a tool adapted to release the locking mechanism within the chair sled receiver 500 to allow the chair sled assembly to be removed from its installed position.

Figure 6:
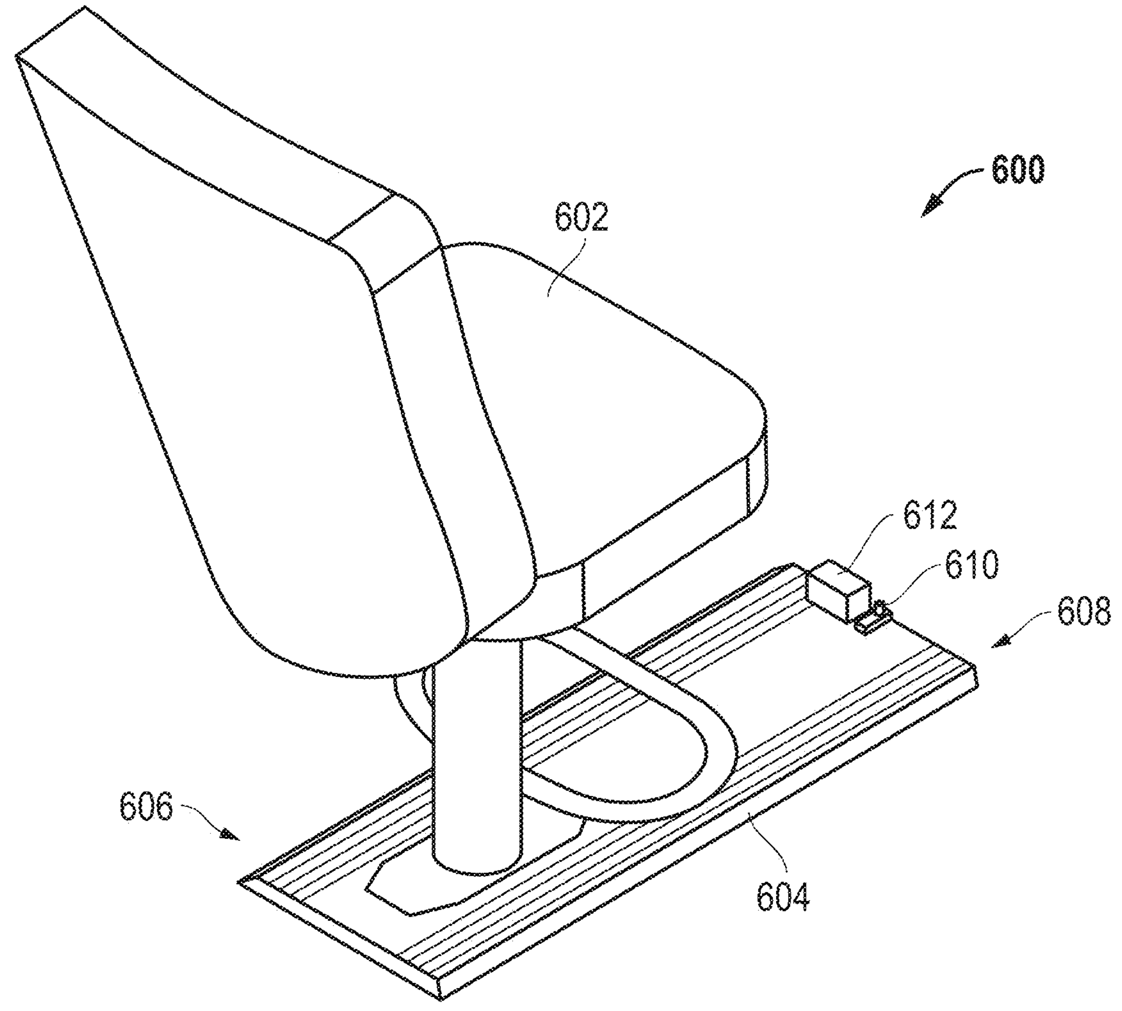
FIG. 6 is an isometric view of a prior art chair sled assembly.

Referring now to FIG. 6, a standard chair sled assembly 600 includes a chair 602 and a chair sled base 604. Chair sled base 604 has a distal end shown generally at 606 and a proximal end or connecting end shown generally at 608. A locking pin 610 is connected at the chair sled base proximal end 608 adjacent to an electrical connection box 612. Electrical connection box 612 may include electrical plugs or connectors for providing an electrical connection to electronic elements that may be included on chair sled assembly 600 such as lighting elements, speakers, and/or haptic feedback elements (not shown).

Figure 7:
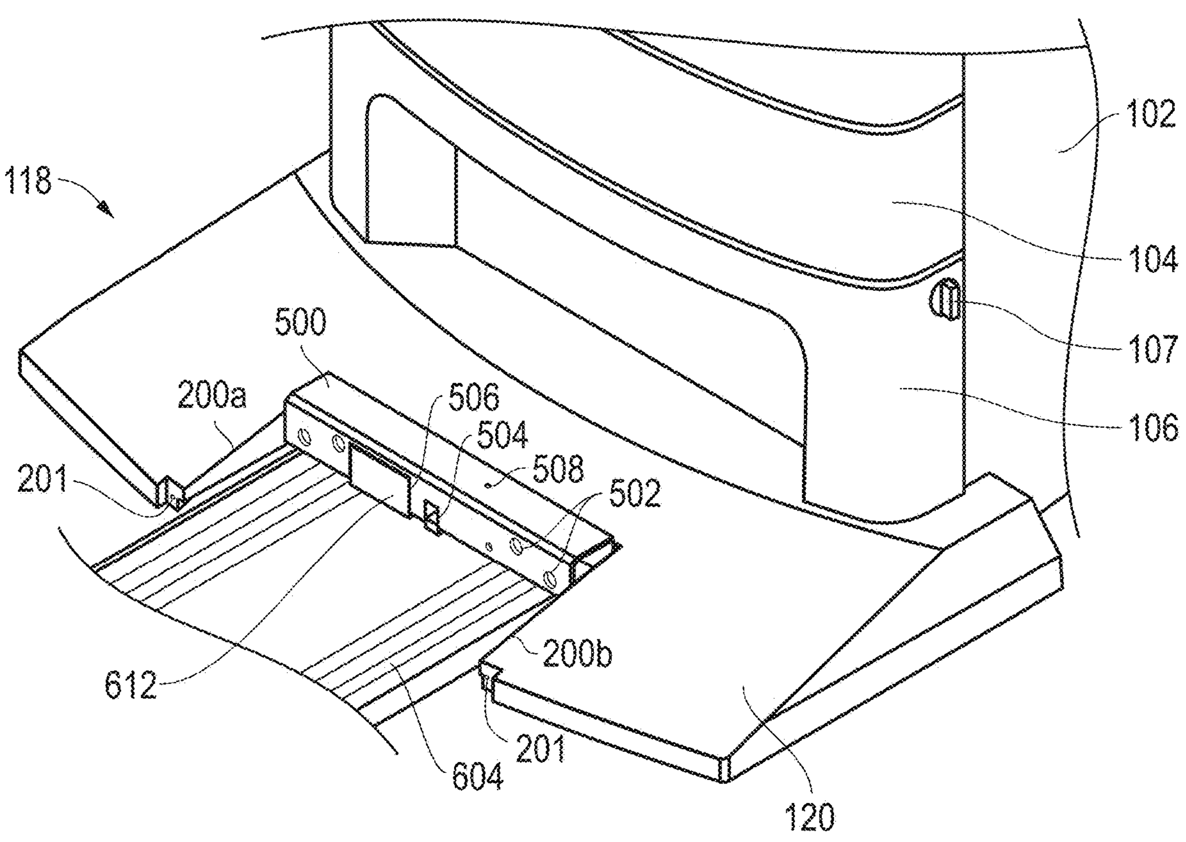
FIG. 7 is an isometric view similar to FIG. 5 but with the proximal end of the chair sled base received in the chair sled receiver.

FIG. 7 shows a portion of chair sled base 604 with the proximal end 608 connected in an operating position with chair sled receiver 500. In this position locking pin 610 (shown in FIG. 6) is received in pin receiver slot 504 and locked in position with the locking mechanism housed within receiver 500. FIG. 7 also shows electrical connector box 612 received in electrical connection receiver area 506 of receiver 500.

Figure 8:
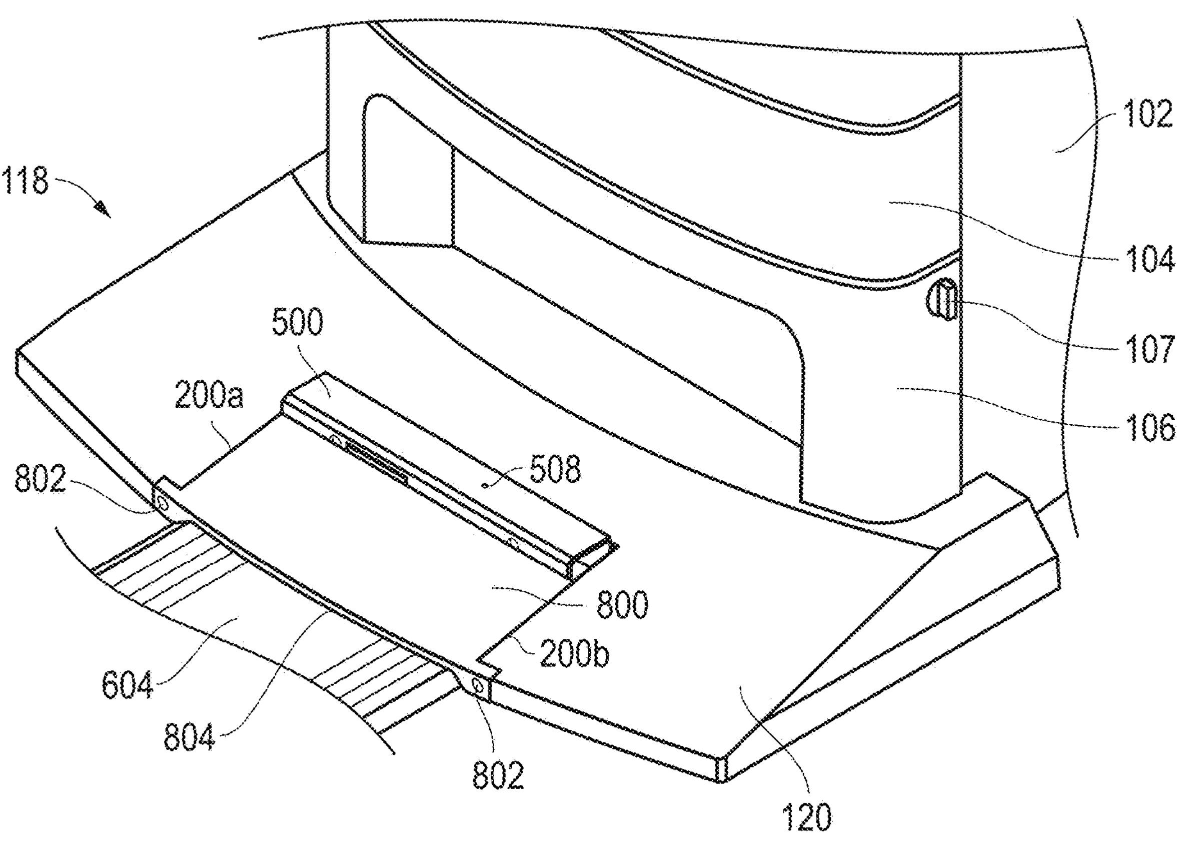
FIG. 8 is an isometric view similar to FIG. 7 but with the sled cover connected in its installed position on the base structure.

FIG. 8 shows that a sled cover 800 may be connected over the received chair sled base 604 to cover at least a portion of the base access opening defined between opening edges 200*a* and 200*b* in FIG. 8. Sled cover 800 includes fastener openings 802 to allow the sled cover 800 to be secured in the position shown in FIG. 8 using fasteners and the openings 201 in the base structure 118 shown in FIGS. 2 through 5. Sled cover 800 also includes a recessed area 804 along the front edge to accommodate the thickness of chair sled base 604. In this particular example, an upper part of chair sled receiver 500 protrudes out of a rear portion of the base access opening and thus chair sled cover 800 does not extend the entire depth of the base access opening (200 in FIG. 2). Rather, a rear edge of sled cover 800 generally abuts a front surface of chair sled receiver 500. It will be appreciated that other implementations of a chair sled attachment assembly in accordance with aspects of the present invention may include a base structure that allows the entire chair sled receiver 500 to be received in the base volume. In implementations such as that shown in FIG. 8, the sled cover 800 may include a portion that extends over the protruding part of chair sled receiver 500 to conceal the chair sled receiver at least from the front of the gaming machine 100. Other implementations may dispense with sled cover 800 and leave chair sled receiver 500 and chair sled base 604 exposed in operation of the gaming machine, generally in the condition shown in FIG. 7.

Figure 9:
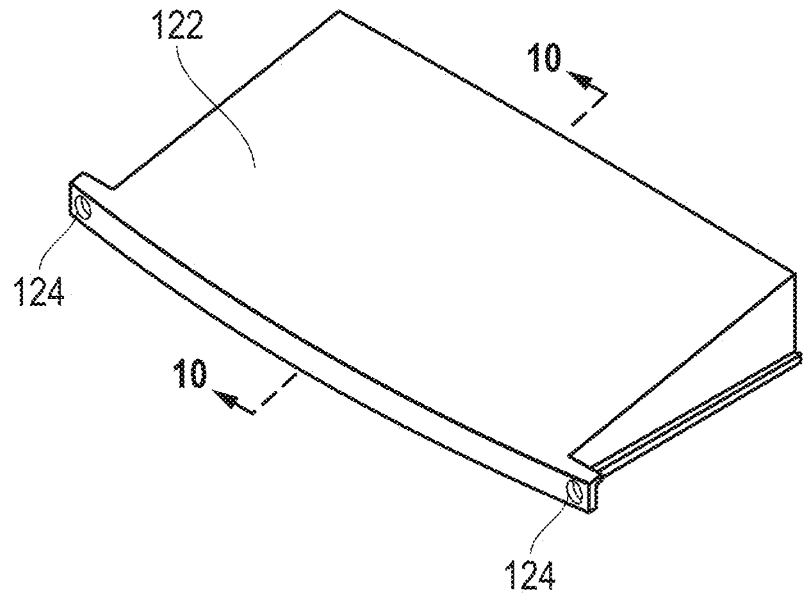
FIG. 9 is an isometric view of the base access panel shown in FIGS. 1 and 2.
Figure 10:
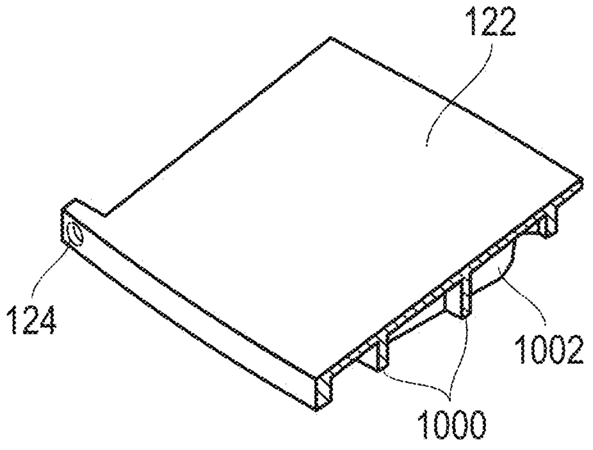
FIG. 10 is a view in section taken along line 10-10 in FIG. 9.

FIGS. 9 and 10 show base access panel 122 separate from gaming machine 100. As best shown in the section view of FIG. 10 example base access panel 122 includes a series of internal structural ribs for improving the rigidity. The example shows laterally extending ribs 1000 and longitudinally extending ribs 1002. Additional laterally extending ribs and longitudinally extending ribs may be included in base access panel 122 beyond those shown in the section view of FIG. 10.

Figure 11:
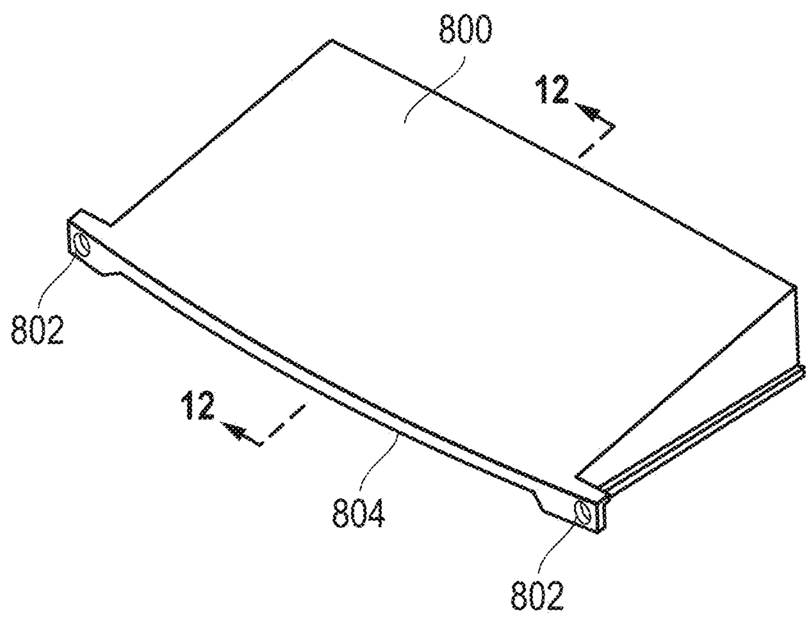
FIG. 11 is an isometric view of the sled cover shown in FIG. 8.
Figure 12:
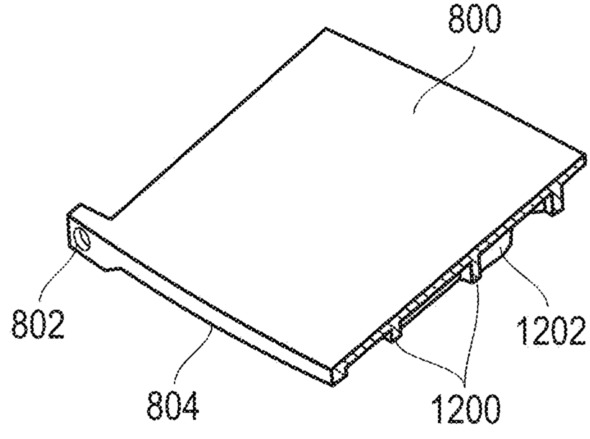
FIG. 12 is a view in section taken along line 12-12 in FIG. 11.

FIGS. 11 and 12 show the example sled cover 800 described above in connection with FIG. 8. As shown in the section view of FIG. 12 sled cover 800 includes structural ribs similar to those for base access panel 122. In particular sled cover 800 includes laterally extending ribs 1200 and longitudinal ribs 1202. As with base access panel 122, any suitable rib structure or any other structure features may be included in sled cover 800 to improve rigidity or otherwise improve the structure.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above-described representative embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

The invention claimed is:

1. A chair sled attachment assembly for a gaming machine that includes a cabinet having a secure access arrangement for providing access to a secure volume of the cabinet, the chair sled attachment assembly comprising:

(a) a base structure connected to the cabinet in a base position projecting in a front direction from a front side of the cabinet;

(b) the base structure including a base cover defining a base volume separate from the secure volume of the cabinet;

(c) a chair sled receiver supported on the base structure in a chair sled receiver operating position in which the chair sled receiver is at least partially located within the base volume, the chair sled receiver including a chair sled receiving feature adapted for receiving a portion of a chair sled assembly when a chair sled is placed in an operating position on the gaming machine; and (d) the base structure including a sled cover, the sled cover being removably secured to the base structure in a cover position covering the chair sled receiving feature.

2. The chair sled attachment assembly of claim 1, wherein:

(a) the base cover includes a base access opening; and (b) the sled cover covers at least a portion of the base access opening when in the cover position.

3. The chair sled attachment assembly of claim 2, wherein a portion of the chair sled receiver in the chair sled receiver operating position protrudes from the base volume.

4. The chair sled attachment assembly of claim 3, wherein when the sled cover is in the cover position a rear edge of the sled cover substantially abuts a front edge of the chair sled receiver.

5. The chair sled attachment assembly of claim 1, wherein the chair sled receiver is removably connected to a support bracket included in the base structure.

6. The chair sled attachment assembly of claim 1, wherein the chair sled receiver includes an adapter for adapting the gaming machine to receive a chair sled.

7. A gaming machine comprising:

(a) a cabinet having a secure access arrangement for providing access to a secure volume of the cabinet;

(b) a base structure connected to the cabinet in a base position projecting in a front direction from a front side of the cabinet;

(c) the base structure including a base cover defining a base volume separate from the secure volume of the cabinet;

(d) a chair sled receiver supported on the base structure in a chair sled receiver operating position in which the chair sled receiver is at least partially located within the base volume, the chair sled receiver including a chair sled receiving feature adapted for receiving a portion of a chair sled assembly when a chair sled is placed in an operating position on the gaming machine; and (e) the base structure including a sled cover, the sled cover being removably secured to the base structure in a cover position covering the chair sled receiving feature.

8. The gaming machine of claim 7, wherein:

(a) the base cover includes a base access opening; and (b) the sled cover covers at least a portion of the base access opening when in the cover position.

9. The gaming machine of claim 8, wherein a portion of the chair sled receiver in the chair sled receiver operating position protrudes from the base volume.

10. The gaming machine of claim 9, wherein when the sled cover is in the cover position a rear edge of the sled cover substantially abuts a front edge of the chair sled receiver.

11. The gaming machine of claim 7, wherein the chair sled receiver is removably connected to a support bracket located within the base structure.

12. The gaming machine of claim 8, wherein the chair sled receiver includes an adapter for adapting the gaming machine to receive a chair sled.

13. A method of attaching a chair sled to a gaming machine, the method comprising:

(a) removing a removable cover portion from a base structure of a cabinet of the gaming machine, the cabinet having a secure access arrangement for providing access to a secure volume of the cabinet, wherein the base structure projects in a front direction from a front side of the cabinet and defines a base volume separate from the secure volume and wherein a chair sled receiver in a chair sled receiver operating position on the base structure is at least partially exposed upon removing the removable cover portion from the base structure;

(b) with the removable cover portion removed and the chair sled receiver in the chair sled receiver operating position, inserting a connecting end of the chair sled to a locked position within the chair sled receiver; and (c) with the connecting end of the chair sled in the locked position within the chair sled receiver, covering at least a portion of the connecting end of the chair sled by removably attaching a sled cover to the base structure.

14. The method of claim 13, wherein removing the removable cover portion exposes an access opening in a base cover of the base structure and wherein inserting the connecting end of the chair sled to the locked position comprises inserting the connecting end of the chair sled through the access opening.

* * * * *